(12) United States Patent
Ziv et al.

(10) Patent No.: US 7,900,063 B2
(45) Date of Patent: Mar. 1, 2011

(54) APPARATUS AND METHOD FOR SECURING DATA ON A PORTABLE STORAGE DEVICE

(75) Inventors: Aran Ziv, Hertzliya (IL); Eyal Bychkov, Hod Hasharon (IL)

(73) Assignee: SanDisk IL Ltd., Kfar Saba (IL)

( * ) Notice: Subject to any disclaimer, the term of this patent is extended or adjusted under 35 U.S.C. 154(b) by 0 days.

(21) Appl. No.: 12/345,270

(22) Filed: Dec. 29, 2008

(65) Prior Publication Data

US 2009/0119517 A1 May 7, 2009

Related U.S. Application Data

(63) Continuation of application No. 10/304,772, filed on Nov. 27, 2002, now Pat. No. 7,478,248.

(51) Int. Cl.
*G06F 11/30* (2006.01)
*G06F 7/04* (2006.01)

(52) U.S. Cl. .......................................... 713/193; 726/26
(58) Field of Classification Search .................. 713/193; 726/26
See application file for complete search history.

(56) References Cited

U.S. PATENT DOCUMENTS

| | | | |
|---|---|---|---|
| 688,054 A | 12/1901 | Cheng et al. | |
| 4,816,654 A | 3/1989 | Anderl et al. | |
| 4,864,542 A | 9/1989 | Oshima et al. | |
| 4,882,474 A | 11/1989 | Anderl et al. | |
| 5,282,247 A | 1/1994 | McLean et al. | |
| 5,379,344 A * | 1/1995 | Larsson et al. | 380/251 |
| 5,392,351 A | 2/1995 | Hasebe et al. | |
| 5,418,852 A | 5/1995 | Itami et al. | |
| 5,457,746 A | 10/1995 | Dolphin et al. | |
| 5,623,637 A * | 4/1997 | Jones et al. | 711/164 |
| 5,692,190 A | 11/1997 | Williams | |
| 5,719,387 A * | 2/1998 | Fujioka | 235/492 |
| 5,828,053 A | 10/1998 | Kinugasa et al. | |
| 5,857,021 A * | 1/1999 | Kataoka et al. | 705/54 |
| 5,963,983 A | 10/1999 | Sakakura | |
| 6,035,380 A | 3/2000 | Shelton et al. | |
| 6,088,802 A | 7/2000 | Bialick et al. | |
| 6,257,486 B1 * | 7/2001 | Teicher et al. | 235/380 |
| 6,371,377 B2 * | 4/2002 | Asoh et al. | 235/487 |
| 6,415,383 B1 | 7/2002 | Colegrove | |
| 6,427,200 B1 | 7/2002 | Wu | |

(Continued)

FOREIGN PATENT DOCUMENTS

GB 2377525 A 1/2003

(Continued)

OTHER PUBLICATIONS

Restriction Requirement for U.S. Appl. No. 12/257,989, dated Oct. 30, 2009, 6 pages.

(Continued)

*Primary Examiner* — Techane J Gergiso
(74) *Attorney, Agent, or Firm* — Brinks Hofer Gilson & Lione

(57) ABSTRACT

A portable storage device including a microprocessor and a secure user data area, the microprocessor operable to perform on-the-fly encryption/decryption of secure data stored on the storage device under a user password, the microprocessor also operable to exclude access to the secure user data area unless the user password is provided.

35 Claims, 8 Drawing Sheets

U.S. PATENT DOCUMENTS

| | | | |
|---|---|---|---|
| 6,480,914 B1 | 11/2002 | Hsieh | |
| 6,550,011 B1 | 4/2003 | Sims et al. | |
| 6,560,052 B2 | 5/2003 | Ng et al. | |
| 6,577,735 B1 | 6/2003 | Bharat | |
| 6,639,843 B2 | 10/2003 | Miyauchi | |
| 6,725,322 B1 | 4/2004 | Shiraishi et al. | |
| 6,738,877 B1 | 5/2004 | Yamakawa et al. | |
| 6,757,770 B1 * | 6/2004 | Terada et al. | 710/260 |
| 6,763,424 B2 | 7/2004 | Conley | |
| 6,763,465 B1 * | 7/2004 | Kelley et al. | 726/18 |
| 6,768,942 B1 * | 7/2004 | Chojnacki | 701/200 |
| 6,865,431 B1 * | 3/2005 | Hirota et al. | 700/94 |
| 6,880,054 B2 | 4/2005 | Cheng et al. | |
| 6,931,503 B1 | 8/2005 | Robb et al. | |
| 6,950,939 B2 * | 9/2005 | Tobin | 713/182 |
| 6,976,165 B1 | 12/2005 | Carpentier et al. | |
| 6,999,947 B2 * | 2/2006 | Utsumi et al. | 705/59 |
| 7,036,738 B1 | 5/2006 | Vanzini et al. | |
| 7,039,811 B2 | 5/2006 | Ito et al. | |
| 7,043,615 B1 | 5/2006 | Kobayashi et al. | |
| 7,054,990 B1 * | 5/2006 | Tamura et al. | 711/103 |
| 7,055,038 B2 | 5/2006 | Porter et al. | |
| 7,069,447 B1 * | 6/2006 | Corder | 713/189 |
| 7,100,053 B1 | 8/2006 | Brown et al. | |
| 7,124,301 B1 * | 10/2006 | Uchida | 713/189 |
| 7,137,011 B1 | 11/2006 | Harari et al. | |
| 7,162,645 B2 * | 1/2007 | Iguchi et al. | 713/193 |
| 7,227,952 B2 | 6/2007 | Qawami et al. | |
| 2001/0032088 A1 * | 10/2001 | Utsumi et al. | 705/1 |
| 2002/0029254 A1 | 3/2002 | Davis et al. | |
| 2002/0029343 A1 | 3/2002 | Kurita et al. | |
| 2002/0044663 A1 | 4/2002 | King et al. | |
| 2002/0118095 A1 | 8/2002 | Estes et al. | |
| 2002/0145507 A1 | 10/2002 | Foster et al. | |
| 2002/0159601 A1 * | 10/2002 | Bushmitch et al. | 380/277 |
| 2002/0194479 A1 | 12/2002 | Beuten et al. | |
| 2003/0005337 A1 * | 1/2003 | Poo et al. | 713/202 |
| 2003/0041253 A1 * | 2/2003 | Matsui et al. | 713/189 |
| 2003/0043634 A1 | 3/2003 | Miyauchi | |
| 2003/0078709 A1 | 4/2003 | Yester et al. | |
| 2003/0097340 A1 * | 5/2003 | Okamoto et al. | 705/65 |
| 2003/0126451 A1 | 7/2003 | Gorobets | |
| 2003/0191716 A1 | 10/2003 | Wood et al. | |
| 2003/0229791 A1 * | 12/2003 | De Jong | 713/182 |
| 2004/0059925 A1 * | 3/2004 | Benhammou et al. | 713/189 |

FOREIGN PATENT DOCUMENTS

| | | |
|---|---|---|
| WO | WO 01/61692 | 8/2001 |

OTHER PUBLICATIONS

Office Action for U.S. Appl. No. 12/257,989, 11 pages, Jul. 6, 2010.

Notice of Allowance for U.S. Appl. No. 12/345,286, 15 pages, Oct. 18, 2010.

* cited by examiner

APPARATUS AND METHOD FOR SECURING DATA ON A PORTABLE STORAGE DEVICE

CROSS-REFERENCE TO RELATED APPLICATION

This application is a continuation of U.S. application Ser. No. 10/304,772, filed Nov. 27, 2002, now U.S. Pat. No. 7,478,248, which is hereby incorporated by reference.

FIELD AND BACKGROUND OF THE INVENTION

The present invention relates to portable storage devices, and in particular to portable storage devices including a microprocessor.

Portable storage devices are in commercial use for many years to carry data from one computer to another or to store backup data. The simpler devices, such as floppy disks or writable CDs are dumb in the sense that they do not include processing power. The more sophisticated ones, such as portable hard disk drives or portable flash memory disks, do include a microprocessor for controlling the storage management.

When a portable storage device is connected to a computer, the computer takes control over the read/write operation via its operating system. Thus, there is a procedure of "mounting" the portable storage device, in which data exchanged between the device and the computer establishes the storage device as another disk drive, and from this moment on, the computer controls all read/write operations under well-established standards. If the storage device is dumb, for instance with a floppy disk, then the computer manages all physical addressing through file allocation tables (FAT) that are maintained on the storage device. However, when the storage device includes a microprocessor, the addressing made by the computer is actually virtual, since the microprocessor can transform addresses received from the computer to other addresses, for example for wear-leveling of flash memory disks.

A user of a portable storage device may lose it and then face the risk of others reading his files. This may be highly undesirable since such files may contain personal or commercially-confidential information. A commonly-used solution for protecting data is encryption. A file that is considered confidential will be encrypted using a common encryption algorithm such as Data Encryption Standard (DES) or triple-DES using a secret key known only to the user. Thus, an obvious way for protecting data carried on a portable storage device would be encrypting it on the computer and then copying the encrypted version onto the portable device and carrying it securely. When approaching another computer having a compatible decryption software, the user will need to copy the encrypted version onto that computer and key-in the secret key in order to open the file and use it normally.

The method described above will be however inconvenient, since not all visited computers may have the appropriate software, and manual encryption and decryption of individual, selected files is cumbersome.

There is therefore, a need to secure the data stored on portable storage devices independently of a host device, and allow access only when the user has provided an appropriate password or biometric identification data.

OBJECT AND SUMMARY OF THE INVENTION

The object of the present invention is to employ the microprocessor included in a portable storage device for securing data stored in the device in a way that will be both convenient and secure.

According to the present invention there is provided a secure portable storage device for securing user data under a clear key, the portable storage device being connectable to a host device, the host device selectably sending data to be written onto the portable storage device and receiving data read from the portable storage device, the secure portable storage device comprising: a storage medium including a secure user area; and a microprocessor operable to use the clear key to decrypt data read from the secure user area and encrypt data written onto the secure user area.

According to the present invention there is provided a secure portable storage device for securing user data under a user password, the portable storage device being connectable to a host device, the host device selectably sending data to be written onto the portable storage device and receiving data read from the portable storage device, the secure portable storage device comprising: a storage medium including a secure user area; and a microprocessor operable to exclude access from the host device to the secure user area unless the user password is provided to the microprocessor.

According to the present invention there is provided in a first preferred embodiment a method for using a user password for securing and accessing user data exchanged with a host device and stored in a portable storage device, the portable storage device including a microprocessor, the method comprising: (a) generating a secret key by: operating the microprocessor to generate a random clear key, operating the microprocessor to encrypt the clear key with the user password to obtain the secret key, and storing the secret key within the portable storage device; (b) selectably storing first user data in the portable storage device by receiving the first user data from the host device, retrieving the secret key from the portable storage device, operating the microprocessor to decrypt the secret key with the user password to obtain the clear key, and operating the microprocessor to encrypt the first user data and store the encrypted first user data within the portable storage device; and (c) selectably retrieving second encrypted user data from the portable storage device by: reading second encrypted user data from the portable storage device, retrieving the secret key from the portable storage device, operating the microprocessor to decrypt the secret key with the user password to obtain the clear key, and decrypting the second encrypted user data with the clear key and sending the decrypted second user data to the host device.

According to the present invention there is provided in a second preferred embodiment a method for using a user password for securing and accessing user data exchanged with a host device and stored in a portable storage device; the portable storage device including a microprocessor, a secure storage area, and a register to contain a representation of the user password; the method comprising: (a) selectably receiving an entered user password; (b) operating the microprocessor to check the entered user password against the representation of the user password, and then: if the check is positive, operating the microprocessor to allow access, and if the check is negative, operating the microprocessor to exclude access from the secure storage area.

According to the present invention, the second preferred embodiment of the method provided herein further comprises: (a) generating a secret key by operating the microprocessor to generate a random clear key, operating the microprocessor to encrypt the clear key with the user password to obtain the secret key, and storing the secret key within the portable storage device; (b) selectably storing first user data in the portable storage device by receiving the first user data from the host device, retrieving the secret key from the portable storage device, operating the microprocessor to decrypt the secret key with the user password to obtain the clear key, and operating the microprocessor to encrypt the first user data and store the encrypted first user data within the portable storage device; and (c) selectably retrieving second encrypted user data from the portable storage device by reading second encrypted user data from the portable storage device, retrieving the secret key from the portable storage device, operating the microprocessor to decrypt the secret key with the user password to obtain the clear key, and decrypting the second encrypted user data with the clear key and sending the decrypted second user data to the host device.

BRIEF DESCRIPTION OF THE DRAWINGS

The invention is herein described, by way of example only, with reference to the accompanying drawings, wherein.

DETAILED DESCRIPTION OF THE PREFERRED EMBODIMENTS

System Structure

Figure 1:
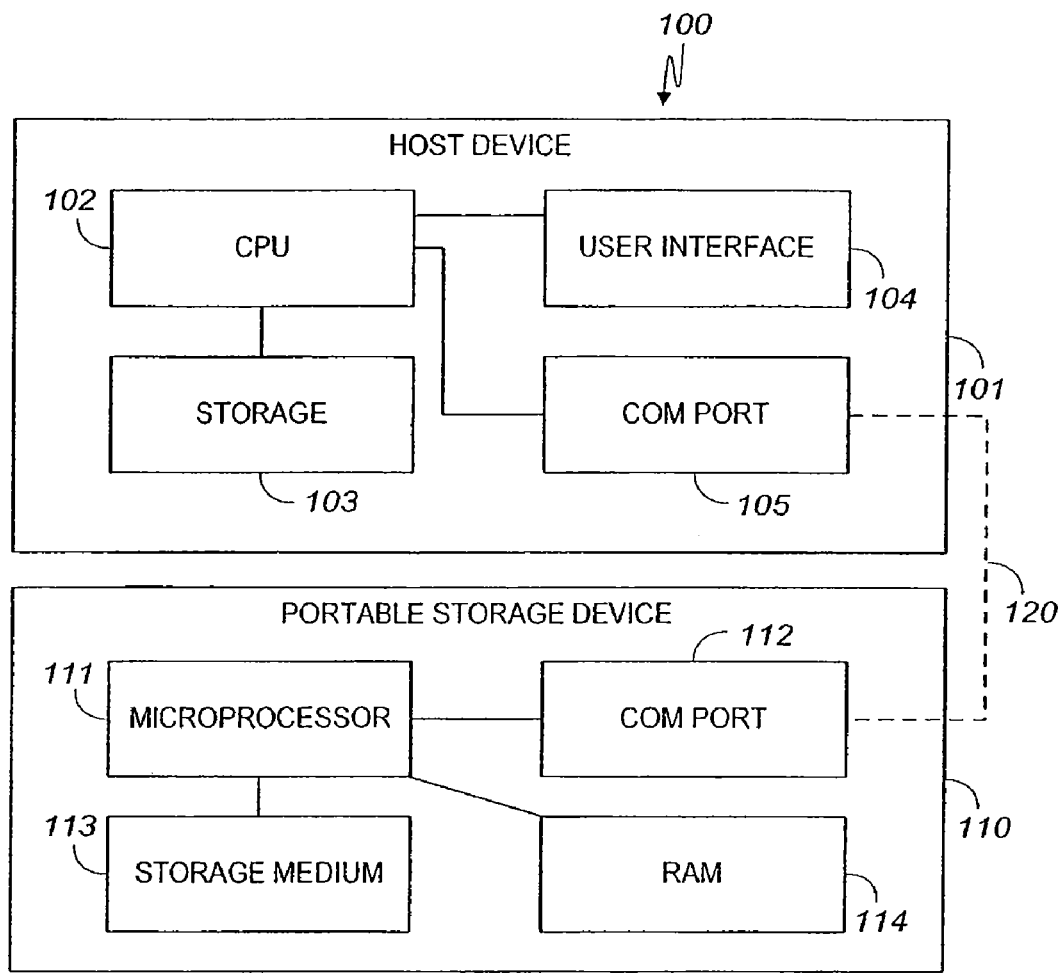
FIG. 1 describes a preferred embodiment of the apparatus of the present invention that includes a host device and a portable storage device.

Referring now to the drawings, FIG. 1 describes a preferred embodiment 100 of the apparatus of the present invention. A host device 101, such as a personal desktop or notebook computer, handheld computer, or cellular communicator, includes a CPU 102, such as an Intel Pentium microprocessor, a storage 103 such as a hard disk or a flash disk, a user interface 104 such as a keyboard and screen, and a communication port 105 for interfacing with external devices, such as a USB (Universal Serial Bus) interface. A portable storage device 110, such as a portable hard disk, flash disk or ZIP drive includes a non-volatile storage medium 113, e.g. magnetic or flash media, a microprocessor 111 to control access to storage medium 113, a volatile memory (e.g. RAM) 114 to cooperate with microprocessor 111, and a communication port 112, such as USB port, to communicate with host device 101. A link 120, such as a USB link, is selectably used to connect and disconnect storage device 110 to host 101 as well as to other compatible host devices, not shown. The portable storage device is energized either via link 120 (e.g. USB) or by using an independent power supply (not shown). However, when device 110 is carried independently, then it is presumed that volatile memory 114 is erased. It should be noticed that host device 101 may, in a generalized case, include a local computer interfacing with portable storage device 101, and a remote computer connected to the local computer via a network, where the remote computer is the one actually exchanging data and password with portable storage device 101 via the local computer that just relays the information. Also, it should be appreciated that link 120 can be any communication instrument usable for connecting a host device with a portable storage device, whether wired or wireless, including a wireless line under the Bluetooth standard. Storage medium 113 can in some embodiments be detachable from portable storage device 110, e.g. in case storage device 110 is a ZIP drive or a portable unit accommodating a Compact Flash or Secure Digital memory module.

Figure 2:
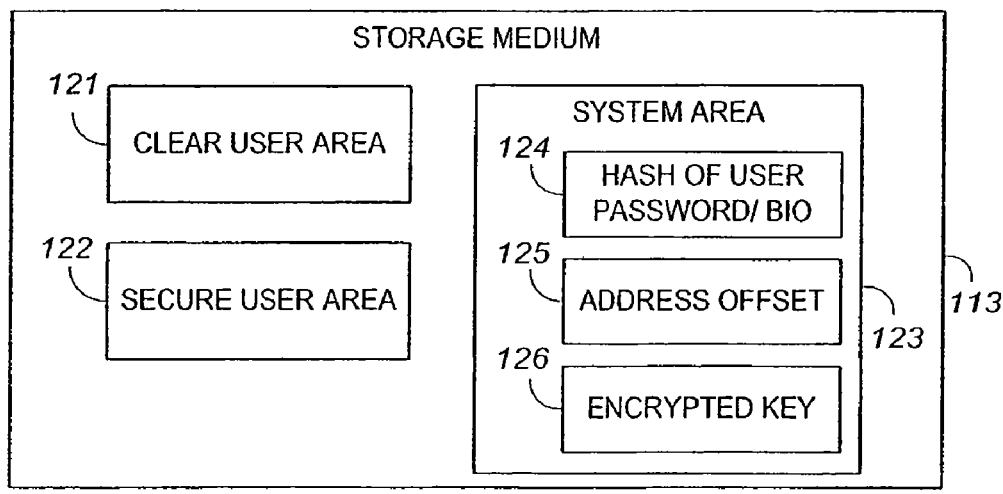
FIG. 2 shows an expanded view of a storage medium of the portable storage device according to the present invention.

FIG. 2 expands the view of storage medium 113 of FIG. 1. Storage medium 113 includes a clear user area 121 that contains unsecured data, a secure area 122 that contains secure user data accessible only upon the provision of a password or biometric signature, and a system area 123. System area 123 is accessible to microprocessor 111, but is not directly accessible to CPU 102 of host device 101 via its file system. System area 123 includes a register 124 that contains a hash of user password or biometric signature; an offset register 125 that includes address offset parameters for accessing the secure area; and a register 126 that includes an encrypted key. The roles of the contents of registers 124-126 will be described in detail hereinbelow. It should be appreciated that storage medium 113 can reside on a multiplicity of physical storage modules, e.g. user areas 121 and 122 can be implemented on a magnetic hard disk, while system area 123 may use a flash memory module. It should also be appreciated that register 124 may contain a clear, un-hashed password or biometric signature.

Figure 3:
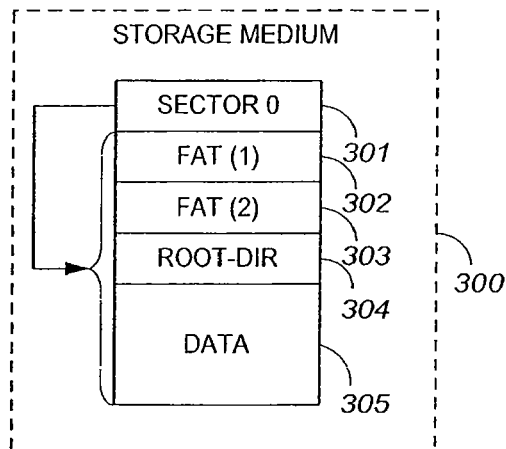
FIG. 3 describes a typical prior art file system.

FIG. 3 describes a typical file system of the prior art used by common personal computers and other computerized devices. A storage medium or "device" 300 is for instance a magnetic or flash medium. A "sector 0" 301 is a predefined address in storage device 300 that provides the size and location of other members 302-305 of the storage device. FAT(1) 302 and FAT(2) 303 are two redundant copies of a file allocation table that is dynamically managed to transform between logical addresses used by an application program and physical addresses where the data is actually stored in data storage area 305. Root directory 304 contains information on files and folders at the base level of the employed hierarchical file system. Data storage area 305 contains user data in files organized under FAT 301-302.

Figure 4A:
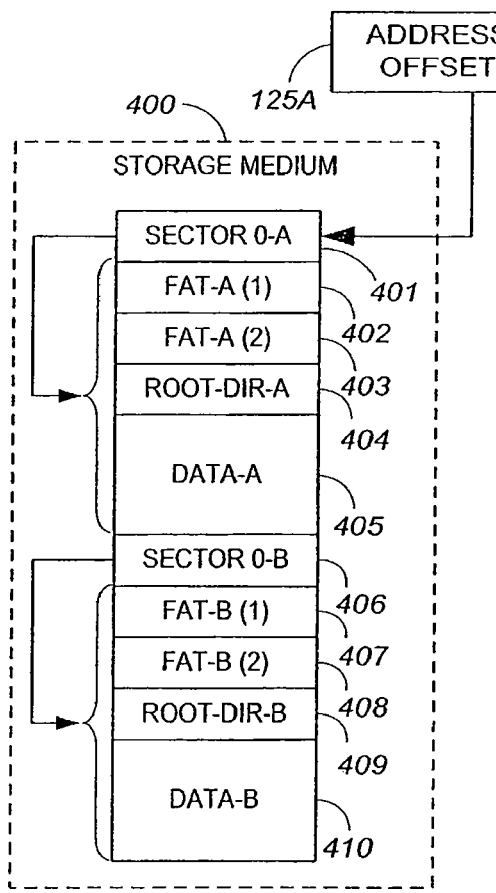
FIGS. 4A and 4B describe preferred embodiments of file systems according to the present invention.
Figure 4B:
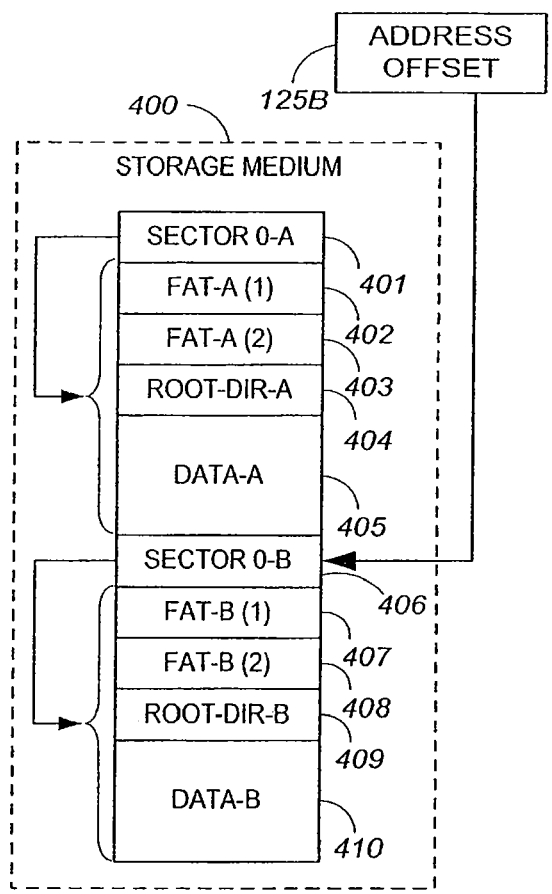

FIGS. 4A and 4B describe a preferred file system used by the present invention. Blocks 401-405 relate to the clear (unsecured) user data area and are similar in their functions to, respectively, blocks 301-305 of FIG. 3. Blocks 406-410 are similar in their functions to, respectively, blocks 301-305, but they relate to the secure data area. When host device 101 approaches storage device 110 to access its file system, it seeks the standard sector-0 address. However, microprocessor 111 looks at the value of address offset register 125, and according to the value 125A or 125B, refers host device 101 to either the clear user data area or the secure user data area, as illustrated in FIGS. 4A and 4B, respectively.

Initial Setup

Figure 5:
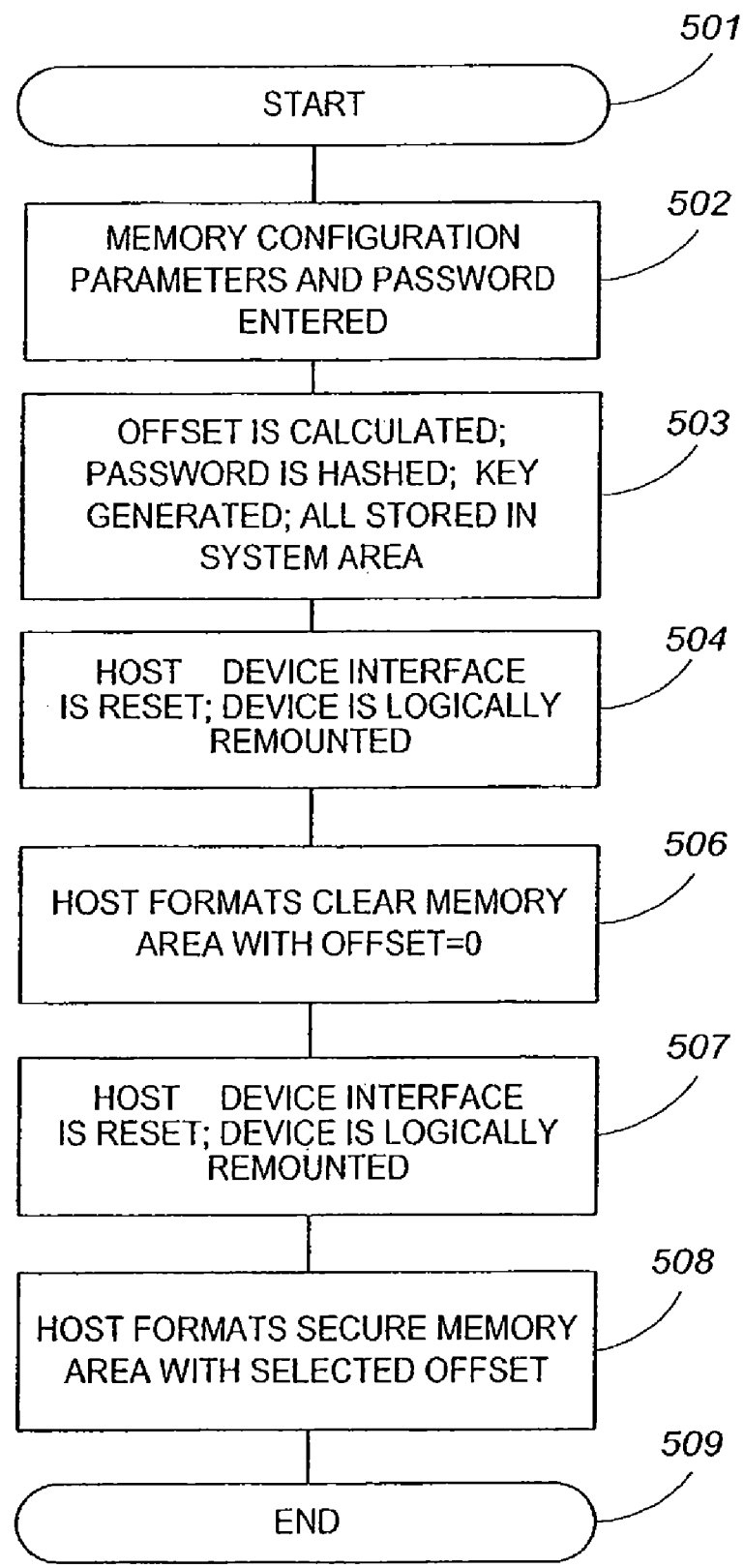
FIG. 5 describes a preferred setup program that configures the portable storage device of the present invention.

FIG. 5 describes a preferred setup program that configures storage device 110, where the user determines the size of the memory allocation for the clear and secure storage areas and establishes these areas. The setup program is stored in either host device 101 or in storage device 110. The procedure starts at 501 where portable storage device 110 is connected to host device 101, where clear storage user area 121 of 113 is preformatted conventionally as in FIG. 3, i.e. secure storage user area 122 is null, and where the setup program is stored on either host storage 103 or on clear user area 121. Still in step 501, the setup program is loaded to run on host device 101.

In step 502, the user is prompted to enter a password (or, alternatively, a biometric signature via a biometric reader such as a fingerprint reader), and also enter the desired allocation of memory for secure area 122. For example, he/she may read on the screen of user interface 104 "64 MB of memory available, please select how much of this you would like to allocate for your secure data", and key in a number such as "48 MB".

In step 503, the memory offset is calculated from the difference between the total user memory and the allocation for secure data; for instance, in the above example, "offset"=64 MB−48 MB=16 MB. Then the password entered in step 502 is hashed by microprocessor 111 using a standard hash algorithm. Microprocessor 111 also generates a random "clear" key and encrypts it using the password (see FIG. 8 below). Finally, the hashed password (henceforth "hashed stored password"), the memory offset parameter and the encrypted key are stored by microprocessor 111 in registers 124, 125 and 126, respectively, of system area 123.

It should be appreciated that the term "password" should be interpreted broadly as data accessible to the user only, which may be a string of alphanumeric characters known to the user only, or a set of biometric parameters read from the user via an appropriate device. A password may be kept with the user only, or kept with and automatically inserted by a trusted host device, e.g. the user's personal desktop computer. Although the most preferred embodiment includes the storage of a hashed password in register 124 as described above, it should be appreciated that in certain cases requiring less security, a non-hashed, clear password may be stored in the register.

In step 504, communication link 120 between storage device 110 and host device 101 is disconnected by microprocessor 111, which from the viewpoint of CPU 102 of the host is interpreted as if the portable storage device has been dismounted or moved to a "device not ready" status. Then CPU 102 continually polls port 105 to identify whether a new device has been connected. When microprocessor 111 reconnects communication link 120, i.e. when storage device 110 is logically remounted, CPU 102 accepts storage medium 113 as if it were a new storage device. However, the parameters of this storage area are represented by microprocessor 111 to cover clear user area 121 only, i.e. address offset 125A is 0 and the size of the storage area is the size allocated by the user in step 502. In step 506 the setup program instructs host device 101 to format clear user area 121, i.e. set up the initial contents of areas 401-405 of FIG. 4A. Now clear user area 121 becomes prepared for future access by application programs running on host device 101.

In step 507, portable storage device 110 is dismounted and remounted again by the setup program similarly to the process in step 504. However, this time, microprocessor 111 represents secure user area 122, i.e. all physical memory addresses are offset by microprocessor 111 by the calculated offset parameter stored in register 125, and the memory size is that allocated by the user for secure user area 122 in step 502. In step 508 the setup program calls host device 101 to format the currently-accessible storage area, this time secure user area 122, i.e. to enter standard formatting parameters into memory segments 406-410 as shown in FIG. 4B. All logical addresses used for formatting are shifted by address offset 125B retrieved from register 125. In step 509, the storage device may be disconnected from host device 101 and be ready for future uses.

Accessing the Secure Area

Figure 6:
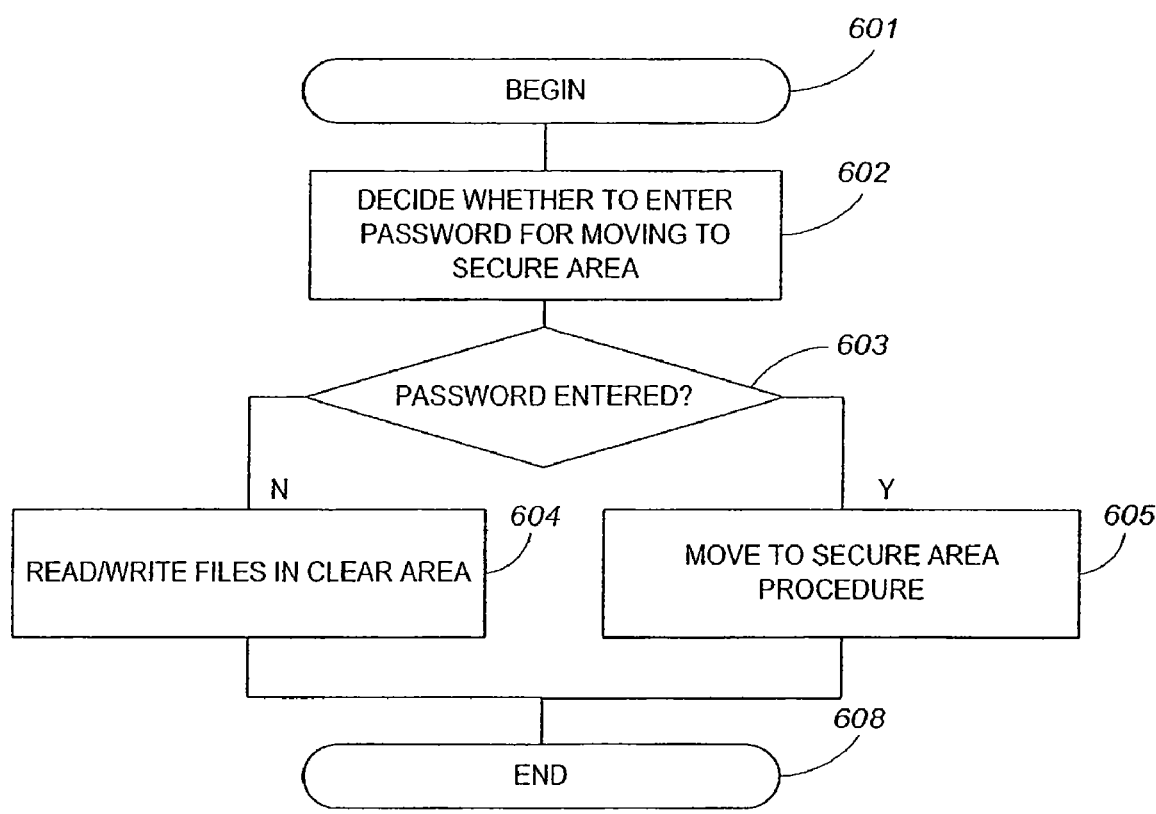
FIG. 6 describes the operation of the portable storage device of the present invention when connected to any compatible host device.

FIG. 6 describes the operation of portable storage device 110 when connected to any compatible host device 101. In step 601 devices 101 and 110 are connected, thus establishing communication link 120. By default, microprocessor 111 uses an address offset of zero, thus the host sees clear user area 121 via "sector 0-A" 401. In step 602, the user may decide whether he wants to continue working in clear user area 121, or wishes to enter a password to enter secure user area 122. If in 603 he has decided to stay in the clear user area, then in step 604 the application programs used by the user will read and/or write files on clear user area 121. However, if in step 603 the user has decided to work in secure user area 122 and has entered a password (or alternatively has provided his/her biometric parameters), then in step 605 lie/she will move to the secure area procedure of FIG. 7. The operation ends in step 608

Figure 7:
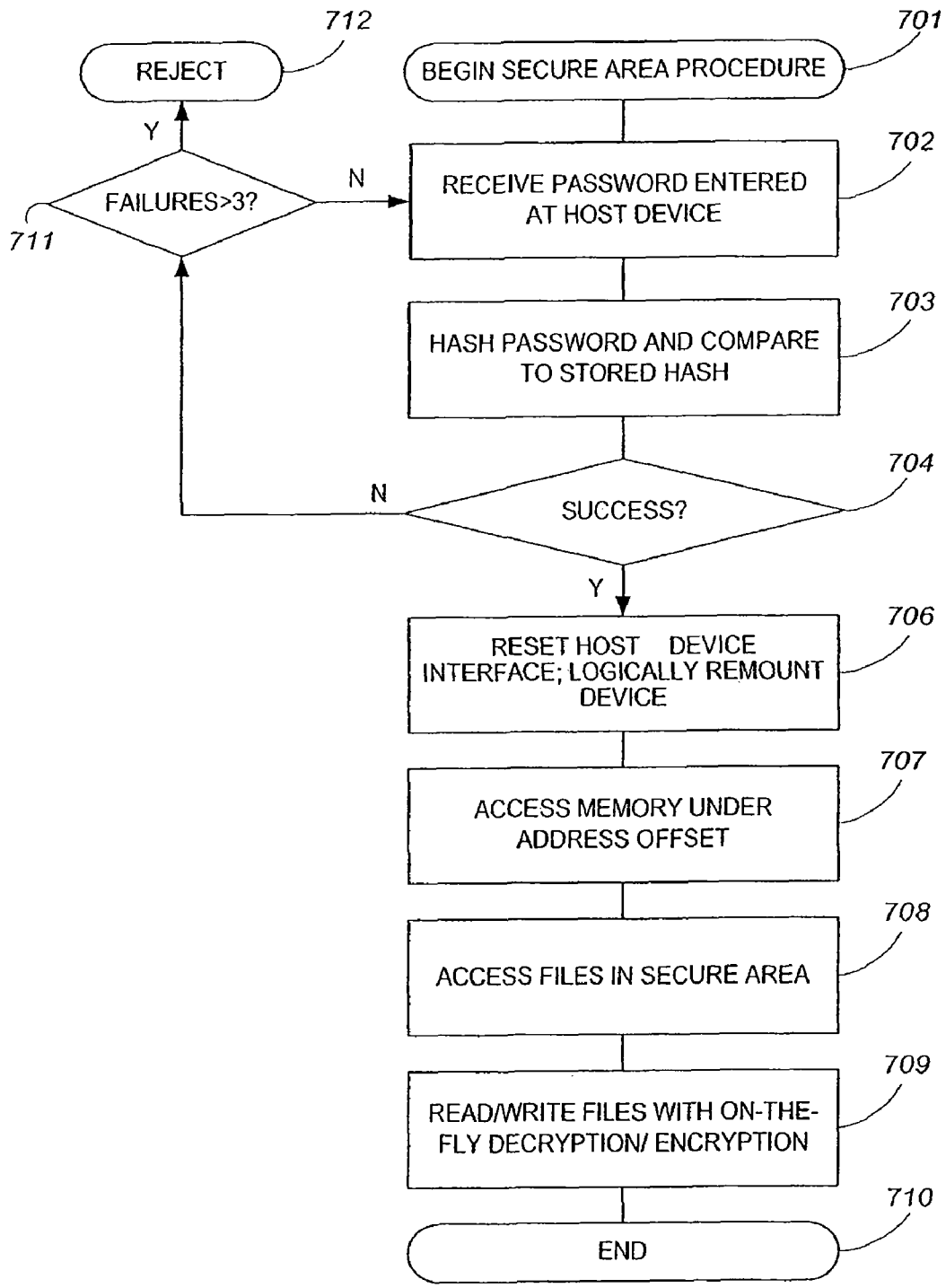
FIG. 7 describes the operation of the apparatus of the present invention.

FIG. 7 describes the operation of system 100 when the user has selected to work in the secure user area and has entered a password (or biometric identification) in steps 602-603 of FIG. 6. In step 701, devices 101 and 110 are connected via link 120, and CPU 102 accesses clear user area 121. If the password has been entered (or the biometric parameters have been read) via user interface 104, then in step 702 this password is moved to microprocessor 111. However, it should be appreciated that, alternatively, the password may have been entered directly into portable storage device 110, by incorporating a keypad or biometric reader therein (not shown), in which case step 702 may become a step of receiving password or biometric data at the portable storage device.

In step 703, the entered password is hashed by microprocessor 111 and the hashed entered password is then compared to the hashed stored password in register 124. The reason for hashing the entered password and comparing it to a hashed stored password rather than storing the password in clear in register 124 is to prevent an attack on the password by disassembling storage device 110 and reading the content of register 124 from storage medium 113 by an external reader. If the hashed entered password matches the stored hashed password in step 703, then step 704 will route the procedure to step 706. Otherwise, there will be two additional attempts via a test 711, which will lead to either a rejection of the access to the secure user area in step 712, or to the successful entry into step 706.

In step 706, controller 111 dismounts and remounts portable storage device 110, similarly to steps 504 or 507 of FIG. 5. However, this time, when remounting device 110, controller 111 will use an address offset according to the content stored in register 125. When in step 707, host 101 will seek "sector 0" of the remounted device, controller 111 will use offset 125B to point at "sector 0-B" 406 of FIG. 4B. In turn, "sector 0"-B 406 will point at areas 407-410. As a result, in step 708 host device 101 will actually see secure area 122 and will be free to read and write files therefrom and thereto, respectively. In step 709, all data read from or written onto memory area 410 is encrypted or decrypted on-the-fly by microprocessor 111, as described is respect to FIGS. 8-10 below. The procedure ends in step 710

On-the-Fly Encryption/Decryption

Steps 701-708 in FIG. 7 show how the access to secure user area 122 is controlled by the present invention and how the access requires a password for accessing the secure area via microprocessor 111. However, since in many cases storage medium 113 can be disassembled from portable storage device 110 and read by an external reader, it is highly desirable to encrypt the data stored onto data-B area 410 of FIGS. 4A-B.

Figure 8:
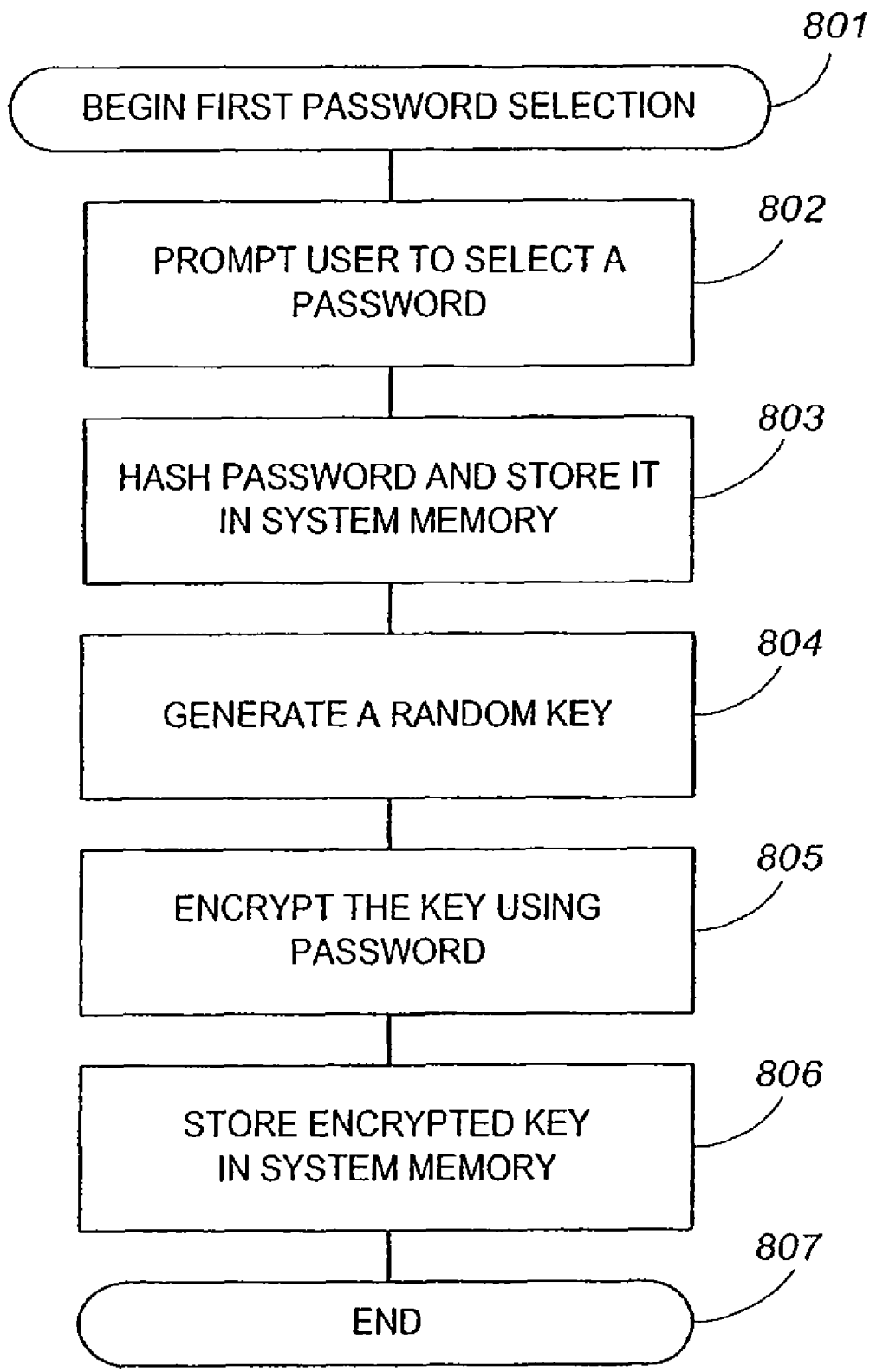
FIG. 8 describes in more detail the steps of entering, hashing and storing a password.

Reference is now made to FIG. 8, which adds detail to steps 502-503 of FIG. 5. When the memory is set up for the first time to establish the secure area (or is reformatted anytime afterwards), the user selects a password in step 802, and then in step 803 the password is hashed using preferably a standard hash algorithm, and stored in register 124 of system memory area 123. In step 804, microprocessor 111 randomly generates a clear key of a preferred length under well-known random-generation techniques. This key will become the permanent encryption key for all data stored in secure memory data-B area 410 of FIG. 4B. In step 805, the key will be encrypted under the user password using a symmetric encryption key method such as DES or triple-DES, or a simpler scrambling method, depending on the desired security level. In step 806, the encrypted version will be stored in register 126 of system area 123. Thus, a representation of the key resides in register 126, but one must know the user password in order to retrieve it. The procedure ends in step 807.

Figure 9:
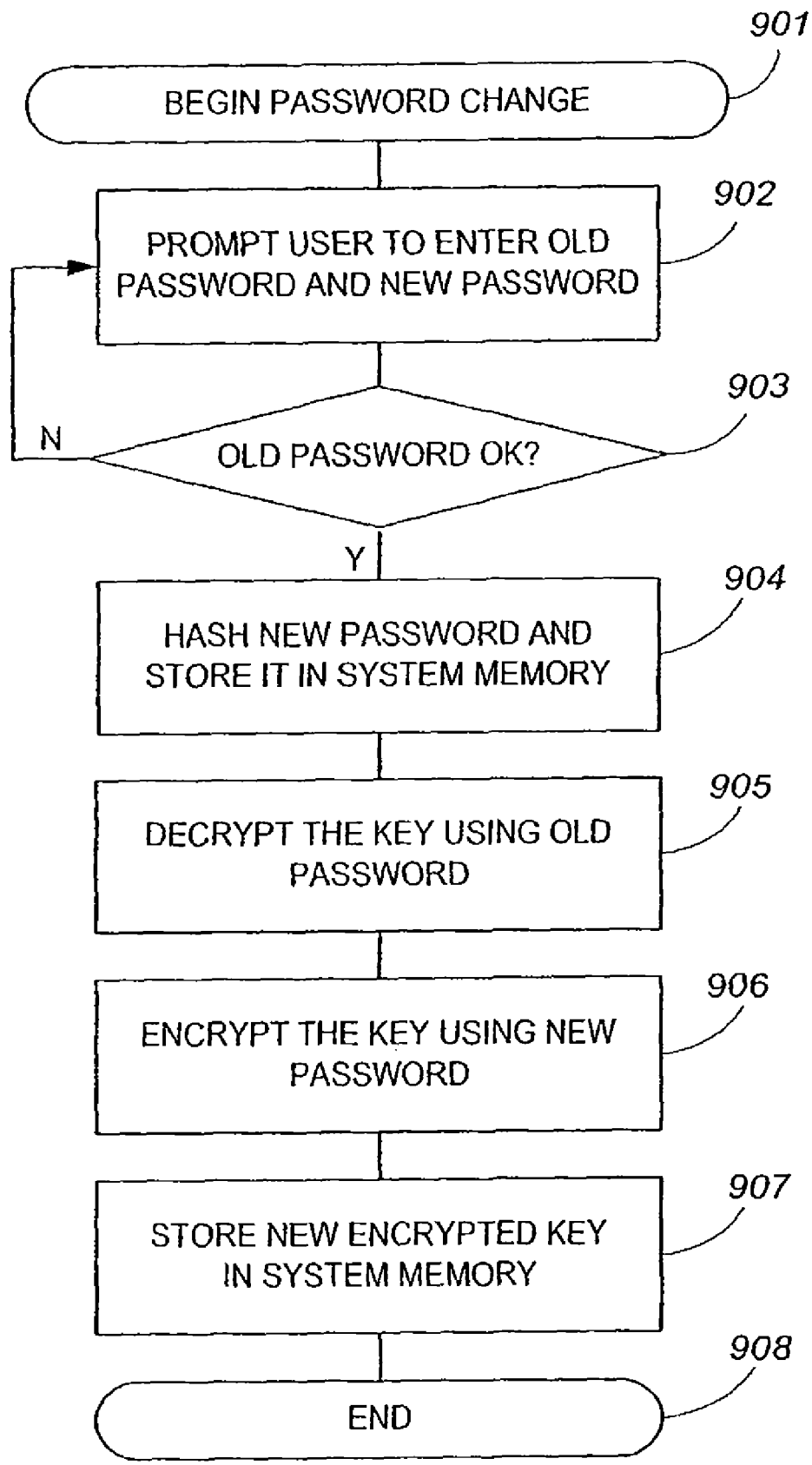
FIG. 9 shows how a password can be changed.

FIG. 9 shows how a password can be changed. The procedure starts at a step 901. In step 902 both old and new passwords are entered by the user. Upon the old password being found valid in step 903, in step 904 the new password is hashed and the new hashed stored password replaces the old hashed stored password in register 124. In step 905, the old encrypted key is retrieved from register 126, and is decrypted to yield the clear memory encryption key. Then in step 906, the clear memory encryption key is re-encrypted using the new password, and in step 907 the new encrypted version is then stored in memory register 126. The procedure ends in step 908.

Figure 10:
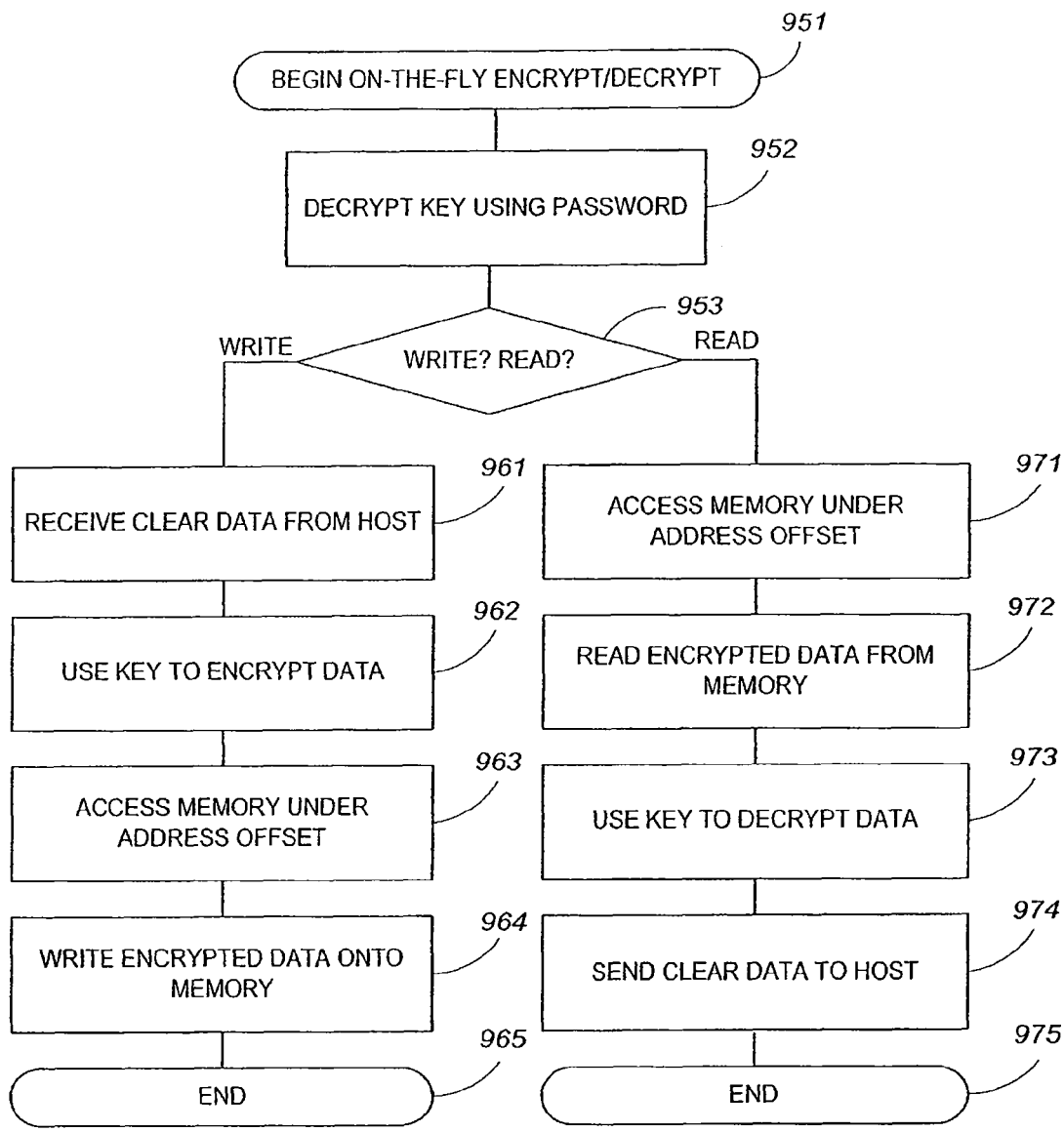
FIG. 10 describes respectively on-the-fly encryption/decryption of data moving between the host device and the portable storage device.

FIG. 10 expands the procedure of step 709 of FIG. 7. It describes respectively on-the-fly encryption/decryption of data moving from/to host device 101 to/from secure data area 410. The procedure starts in step 951. In step 952 the encrypted key is retrieved from register 126, and is decrypted using the password previously entered by the user (in step 603 of FIG. 6 and step 702 of FIG. 7). In step 953, it is decided whether a read or a write process is required. If a write process is called, then in step 961 microprocessor 111 receives a block of clear data from host 101, and in step 962 the key retrieved in step 952 is used by microprocessor 111 to encrypt the received block. In step 963, secure memory area 122 (406-410) is accessed to write the encrypted block thereto, the writing occurring in step 964. Similarly, if in step 953 a read procedure has been called, then in step 971 secure area 122 is accessed, and in step 972 a block of encrypted data is read to be decrypted in step 973 by microprocessor 111, using the key retrieved in step 952. In step 974 the clear data is sent to host 101. The procedures end at steps 965 and 975 respectively.

While the invention has been described with respect to a limited number of embodiments, it will be appreciated that many variations, modifications and other applications of the invention may be made.

What is claimed is:

1. A method for accessing a secure user area of a portable storage device, the method comprising:
   performing, by a portable storage device that has a storage medium including a clear user area and a secure user area, wherein the portable storage device is operative to allow access to the clear user area without requiring a user password and to allow access to the secure user area only upon receiving the user password:
   receiving the user password from a host device in communication with the portable storage device; and
   performing at least one of (a) and (b):
      (a) receiving data from the host device, performing on-the-fly encryption of the data, and storing the encrypted data in the secure user area; and
      (b) reading encrypted data from the secure user area, performing on-the-fly decryption of the encrypted data, and sending the decrypted data to the host device;
   wherein the portable storage device stores a key used for at least one of on-the-fly encryption and on-the-fly decryption, and wherein the key is encrypted.

2. The method of claim 1 further comprising determining that the user password is valid by comparing the user password with a stored password.

3. The method of claim 1 further comprising determining that the user password is valid by hashing the user password and comparing the hashed user password to a stored hashed password.

4. The method of claim 1, wherein the portable storage device is operative to access the secure user area by offsetting a logical address received from the host device by an offset parameter before transforming the logical address to a physical address.

5. The method of claim 4, wherein the offsetting is performed after the host device remounts the portable storage device.

6. The method of claim 1 further comprising configuring a size of the secure user area based on a request by a user.

7. The method of claim 6, wherein the configuring is performed by a program stored in the portable storage device and executed by the portable storage device.

8. The method of claim 6, wherein the configuring is performed only after determining that the user password is valid.

9. The method of claim 1, wherein the portable storage device is further operative to write and read data in the clear user area without encryption and decryption if the user password is not received from the host device.

10. A storage device comprising:
    an interface to a host device; and
    a storage medium including a clear user area and a secure user area;
    wherein the storage device is operative to allow access to the clear user area without requiring a user password and to allow access to the secure user area only upon receiving the user password; and
    wherein the storage device is further operative to:
       receive the user password from the host device via the interface; and
       perform at least one of (a) and (b):
          (a) receive data from the host device, perform on-the-fly encryption of the data, and store the encrypted data in the secure user area; and
          (b) read encrypted data from the secure user area, perform on-the-fly decryption of the encrypted data, and send the decrypted data to the host device;
    wherein the storage device stores a key used for at least one of on-the-fly encryption and on-the-fly decryption, and wherein the key is encrypted.

11. The storage device of claim 10, wherein the storage device is operative to determine that the user password is valid by comparing the user password with a stored password.

12. The storage device of claim 10, wherein the storage device is operative to determine that the user password is valid by hashing the user password and comparing the hashed user password to a stored hashed password.

13. The storage device of claim 10, wherein the storage device is operative to access the secure user area by offsetting a logical address received from the host device by an offset parameter before transforming the logical address to a physical address.

14. The storage device of claim 13, wherein the offsetting is performed after the host device remounts the portable storage device.

15. the storage device of claim 10, wherein the storage device is operative to configure a size of the secure user area based on a request by a user.

16. The storage device of claim 15, wherein the storage device is operative to configure the size of the secure user area by executing a program stored in the portable storage device.

17. The storage device of claim 15, wherein the storage device is operative to configure the size of the secure user only after determining that the user password is valid.

18. The storage device of claim 10, wherein the storage device is further operative to write and read data in the clear user area without encryption and decryption if the user password is not received from the host device.

19. A method for accessing a secure user area of a portable storage device, the method comprising:
    performing, by a portable storage device that has a storage medium including a clear user area and a secure user area, wherein the portable storage device is operative to allow access to the clear user area without requiring a user password and to allow access to the secure user area only upon receiving the user password:
        receiving the user password from a host device in communication with the portable storage device; and
        performing at least one of (a) and (b):
            (a) receiving data from the host device, performing on-the-fly encryption of the data, and storing the encrypted data in the secure user area; and
            (b) reading encrypted data from the secure user area, performing on-the-fly decryption of the encrypted data, and sending the decrypted data to the host device;
    wherein the portable storage device stores a key used for at least one of on-the-fly encryption and on-the-fly decryption, and wherein the portable storage device is operative to access the secure user area by offsetting a logical address received from the host device by an offset parameter before transforming the logical address to a physical address.

20. The method of claim 19 further comprising determining that the user password is valid by hashing the user password and comparing the hashed user password to a stored hashed password.

21. The method of claim 19, wherein the key is encrypted.

22. The method of claim 19, wherein the offsetting is performed after the host device remounts the portable storage device.

23. The method of claim 19 further comprising configuring a size of the secure user area based on a request by a user.

24. The method of claim 23, wherein the configuring is performed by a program stored in the portable storage device and executed by the portable storage device.

25. The method of claim 23, wherein the configuring is performed only after determining that the user password is valid.

26. The method of claim 19, wherein the portable storage device is further operative to write and read data in the clear user area without encryption and decryption if the user password is not received from the host device.

27. A storage device comprising:
    an interface to a host device; and
    a storage medium including a clear user area and a secure user area;
    wherein the storage device is operative to allow access to the clear user area without requiring a user password and to allow access to the secure user area only upon receiving the user password; and
    wherein the storage device is further operative to:
        receive the user password from the host device via the interface; and
        perform at least one of (a) and (b):
            (a) receive data from the host device, perform on-the-fly encryption of the data, and store the encrypted data in the secure user area; and
            (b) read encrypted data from the secure user area, perform on-the-fly decryption of the encrypted data, and send the decrypted data to the host device;
    wherein the storage device stores a key used for at least one of on-the-fly encryption and on-the-fly decryption, and wherein the storage device is operative to access the secure user area by offsetting a logical address received from the host device by an offset parameter before transforming the logical address to a physical address.

28. The storage device of claim 27, wherein the storage device is operative to determine that the user password is valid by comparing the user password with a stored password.

29. The storage device of claim 27, wherein the storage device is operative to determine that the user password is valid by hashing the user password and comparing the hashed user password to a stored hashed password.

30. The storage device of claim 27, wherein the key is encrypted.

31. The storage device of claim 27, wherein the offsetting is performed after the host device remounts the portable storage device.

32. The storage device of claim 27, wherein the storage device is operative to configure a size of the secure user area based on a request by a user.

33. The storage device of claim 32, wherein the storage device is operative to configure the size of the secure user area by executing a program stored in the portable storage device.

34. The storage device of claim 32, wherein the storage device is operative to configure the size of the secure user only after determining that the user password is valid.

35. The storage device of claim 27, wherein the storage device is further operative to write and read data in the clear user area without encryption and decryption if the user password is not received from the host device.

* * * * *

UNITED STATES PATENT AND TRADEMARK OFFICE
CERTIFICATE OF CORRECTION

PATENT NO. : 7,900,063 B2
APPLICATION NO. : 12/345270
DATED : March 1, 2011
INVENTOR(S) : Aran Ziv et al.

It is certified that error appears in the above-identified patent and that said Letters Patent is hereby corrected as shown below:

In the Claims

Column 9, claim 15, line 7, before "storage device of claim 10" replace "the" with --The--.

Signed and Sealed this
Seventeenth Day of May, 2011

David J. Kappos
*Director of the United States Patent and Trademark Office*